UNITED STATES PATENT OFFICE.

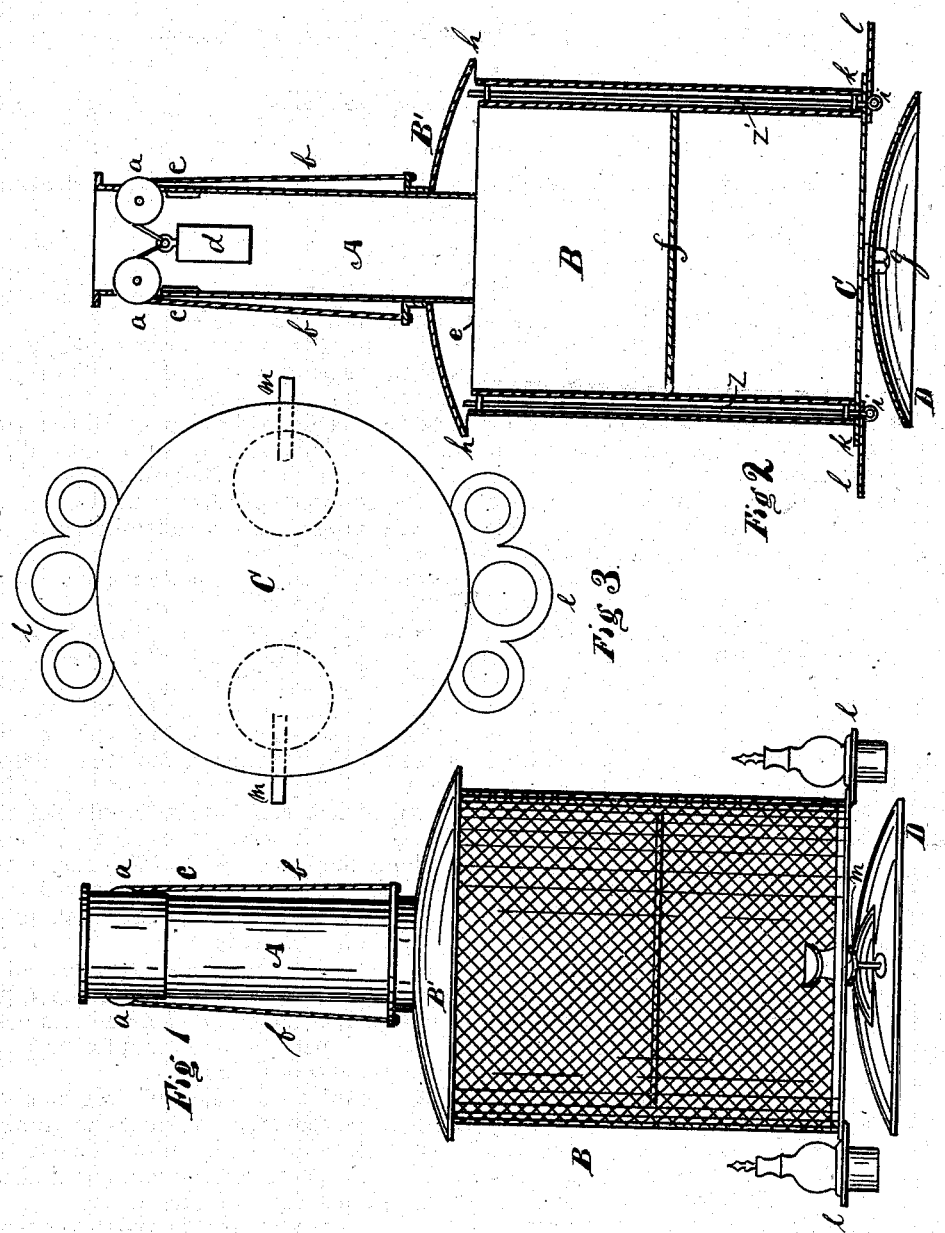

JOEL L. BOND, OF INDIANAPOLIS, INDIANA.

IMPROVEMENT IN CASTERS.

Specification forming part of Letters Patent No. 186,534, dated January 23, 1877; application filed June 26, 1876.

*To all whom it may concern:*

Be it known that I, JOEL L. BOND, of Indianapolis, county of Marion, State of Indiana, have invented a new and useful Improvement in Combined Butter-Dish Holder, Call-Bell, and Caster, of which the following is a description, reference being had to the accompanying drawings.

The nature of my invention is to combine a butter-dish holder, a call-bell, and a caster in one device, as hereinafter described and claimed.

Figure 1 is a side elevation of my improved device. Fig. 2 is a sectional view of the same. Fig. 3 is a plan view of the plate C.

B is a cylindrical drum of wire-gauze, fastened to the cap B', and resting with its lower edge on the circular plate C. This plate C rests on and is fastened to the spheroidal base D by the nut and screw $g$. A is a cylindrical tube, fastened in the plate $e$, and passing through a sleeve in the cap B'. It extends upward to a distance nearly equal to the length of B. At $c$ there is a shoulder-joint, which can be slipped in and out at pleasure. At $a$ and $a$ are two sheave-pulleys. $b$ is a cord, which is fastened at each end to the cap B', and, passing over the pulleys $a$ and $a$, is fastened in the middle to the weight $d$, which weight, moving up and down in the tube A, serves as a counterpoise for the screen B B'. Z and Z' are guides parallel to each other, passing through the plate C, and resting in an eye at $h$ and $h$. The screen B B' has also eyes at $k$ and $k$, to direct it as it is moving up and down. Midway between $e$ and C is another circular plate, $f$. These three plates $e$, $f$, and C are held in their proper places by suitable traces passing from one to the other. Upon the plate C are two sets of caster-holders, at $l$ and $l$, into which may be put proper cruets and bottles. Under this same plate C, at $m$ and $m$, on either side, are call-bells, with protruding handles, the whole device to be as shown in the drawings.

To use this device, cruets and bottles, or either, as may be desired, are put into the caster-holes at $l$. Then, if it be desired to use the part surrounded by B, the screen B B' may be slipped upward until its lower edge is nearly opposite $e$, where it will be held by the counterpoise $d$. Then plates of butter, or any other similar substance, may be set upon C and $f$, and the screen B B' pulled down again to the position shown in Fig. 1. This is to be used at table.

If any of the company desire to be helped to butter, the screen B B' is raised, as much butter as is desired taken from the plate inside, and the screen returned down again. If, however, it is not desired to use the screen B B', the tube A and the guides $i$ and $i$ are taken out, and the screen B B' taken off. Then, with a convenient handle fastened on the plate $e$, it may be used as before, only without the screen B B'. The caster and the call-bells are used in the ordinary way.

What I claim as new, and wish to secure by Letters Patent, is—

1. The combination and arrangement of the screen B B', the cord $b$, the weight $d$, pulleys $a$ and $a$, the guides $i$ and $i$, and the plates C, $f$, and $e$, substantially as and for the purposes set forth and described.

2. A caster device, consisting of a butter-dish holder, covered with an adjustable screen, B, and provided with call-bells $m$ $m$, all arranged to operate in the manner and for the purposes set forth and described.

In testimony whereof I have signed my name to this specification in the presence of two subscribing witnesses.

JOEL L. BOND.

Witnesses:
E. O. FRINK,
JOHN W. JOHNSON.